US006379612B1

(12) United States Patent
Reizer et al.

(10) Patent No.: US 6,379,612 B1
(45) Date of Patent: Apr. 30, 2002

(54) SCALE INHIBITORS

(75) Inventors: James M. Reizer, Sugar Land; Michael G. Rudel, Richmond; Curtis D. Sitz, Katy, all of TX (US); Rex M. S. Wat, Trondehim (NO); Harry Montgomerie, Aberdeen (SN)

(73) Assignee: Champion Technologies, Inc., Houston, TX (US)

( * ) Notice: Subject to any disclaimer, the term of this patent is extended or adjusted under 35 U.S.C. 154(b) by 0 days.

(21) Appl. No.: 09/361,468

(22) Filed: Jul. 27, 1999

Related U.S. Application Data

(60) Provisional application No. 60/094,219, filed on Jul. 27, 1998.

(51) Int. Cl.⁷ .................................................. C23F 11/00
(52) U.S. Cl. ............................... 422/7; 422/7; 422/12; 422/15; 166/279; 166/310
(58) Field of Search .................... 252/8.552, 8.555, 252/180, 7, 12; 422/15, 279; 166/310

(56) References Cited

U.S. PATENT DOCUMENTS

| | | | |
|---|---|---|---|
| 3,699,118 A | 10/1972 | Donham | 260/309.6 |
| 3,770,815 A | 11/1973 | Jones | 260/501.12 |
| 4,024,051 A | 5/1977 | Shell et al. | 208/348 |
| 4,372,870 A * | 2/1983 | Snyder et al. | 422/15 |
| 4,514,286 A | 4/1985 | Wang et al. | 208/196 |
| 4,713,184 A * | 12/1987 | Zaid | 262/8.552 |
| 4,921,592 A | 5/1990 | Alllen et al. | 208/48 |
| 5,112,496 A | 5/1992 | Dhawan et al. | 210/700 |
| 5,529,125 A * | 6/1996 | Di Lullo Arias et al. | 166/307 |

OTHER PUBLICATIONS

Rohm an Hass Company sales brochure, 18 pages (1995).
Banavali, Ellis and Piccolini, *Primene Amines: Harnessing the Reactivity of Amine Chemistry*; 12 pages.
Andress, et al.; *PRIMENE Amines*; 22 pages (Feb. 1994).

* cited by examiner

Primary Examiner—Robert J. Warden, Sr.
Assistant Examiner—Imad Soubra
(74) Attorney, Agent, or Firm—Bracewell & Patterson, L.L.P

(57) ABSTRACT

The present invention provides compositions of oil-soluble inhibitors suitable for use in inhibiting oil field scale formation. The compositions comprise an acid form of a known scale inhibitor and a tertiary alkyl primary amine. These compositions possess advantages over conventional compositions used for inhibiting oil field scale.

20 Claims, 13 Drawing Sheets

Partition of Oil Soluble Scale Inhibitor (Chem II) at Different Temperatures

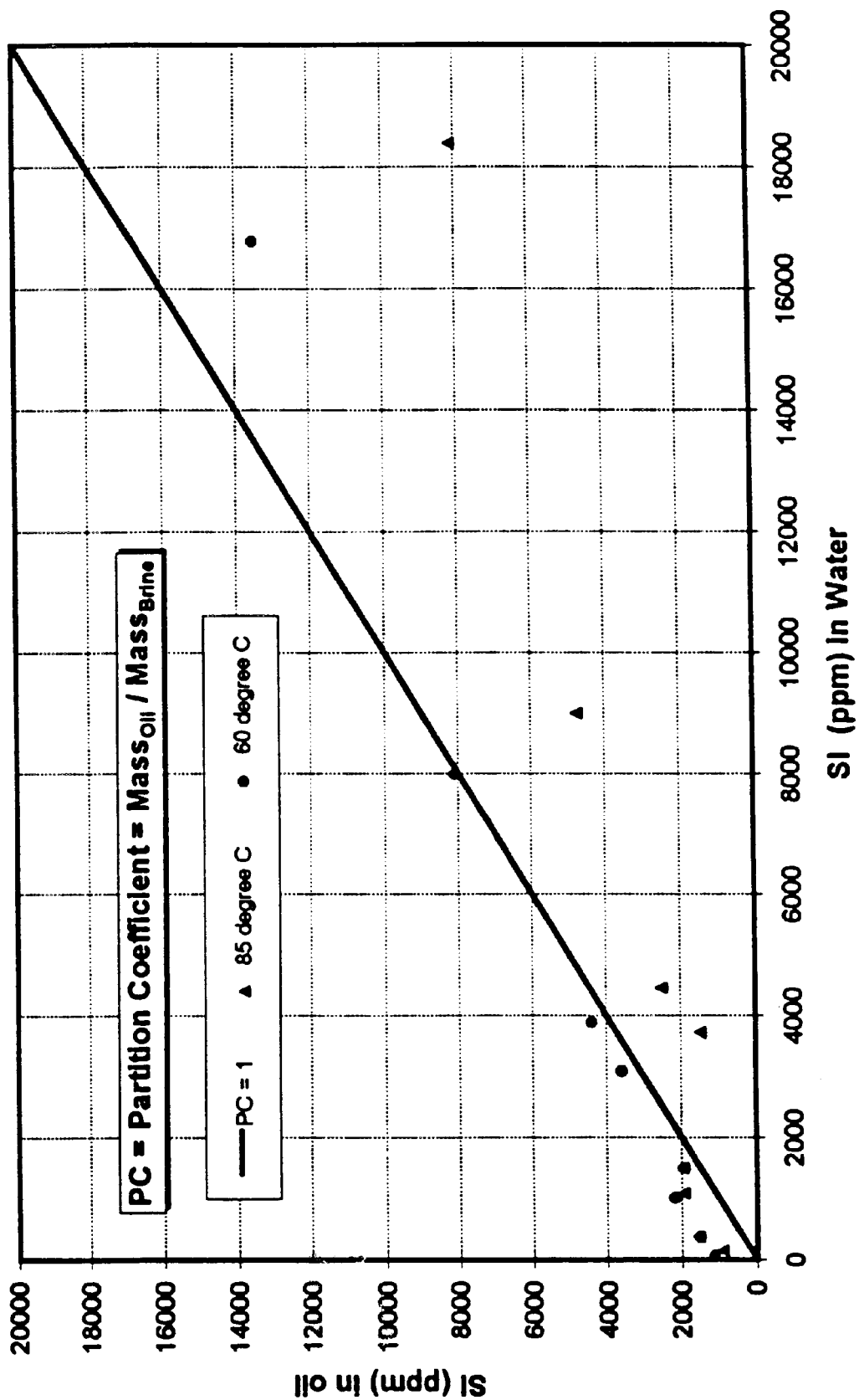

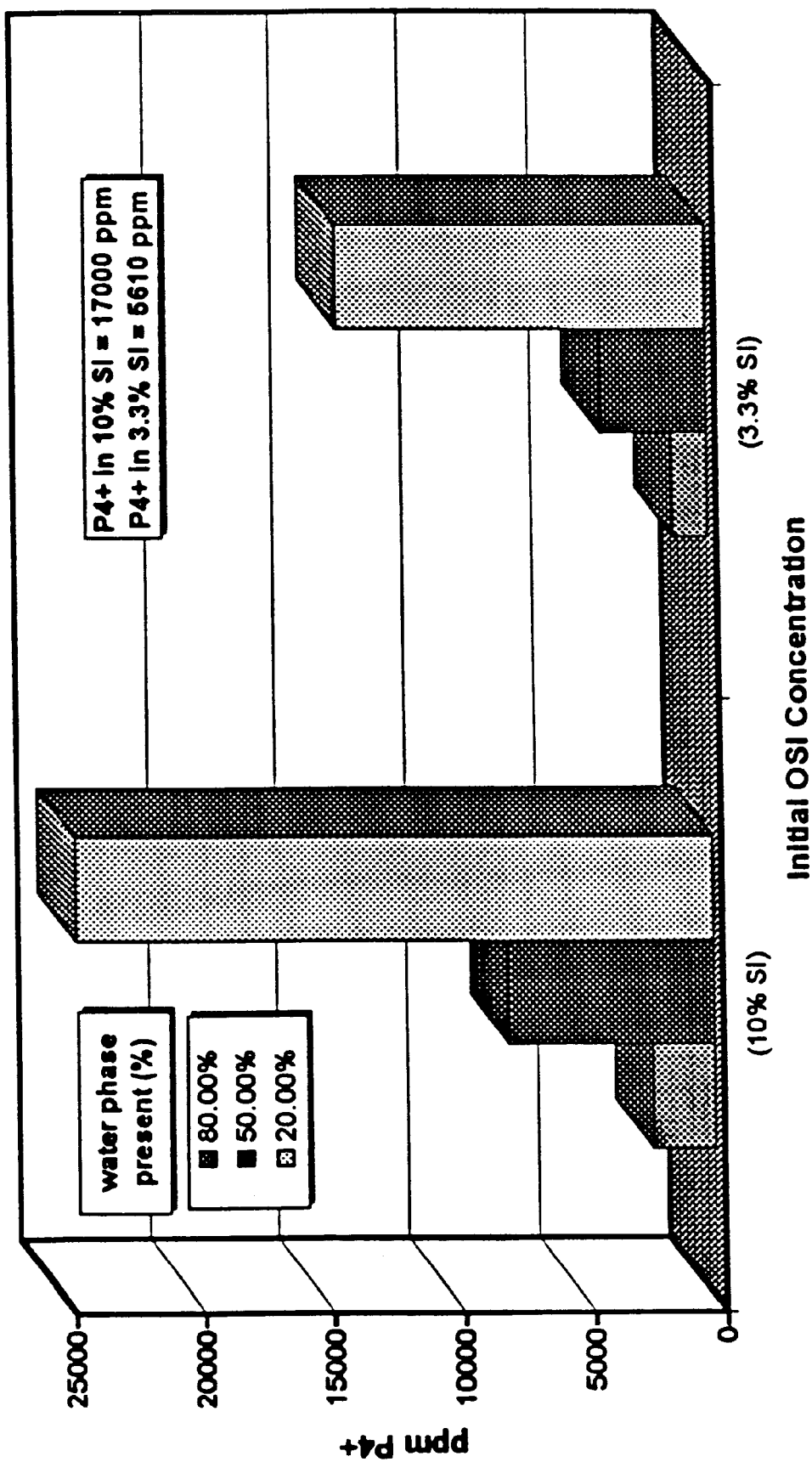

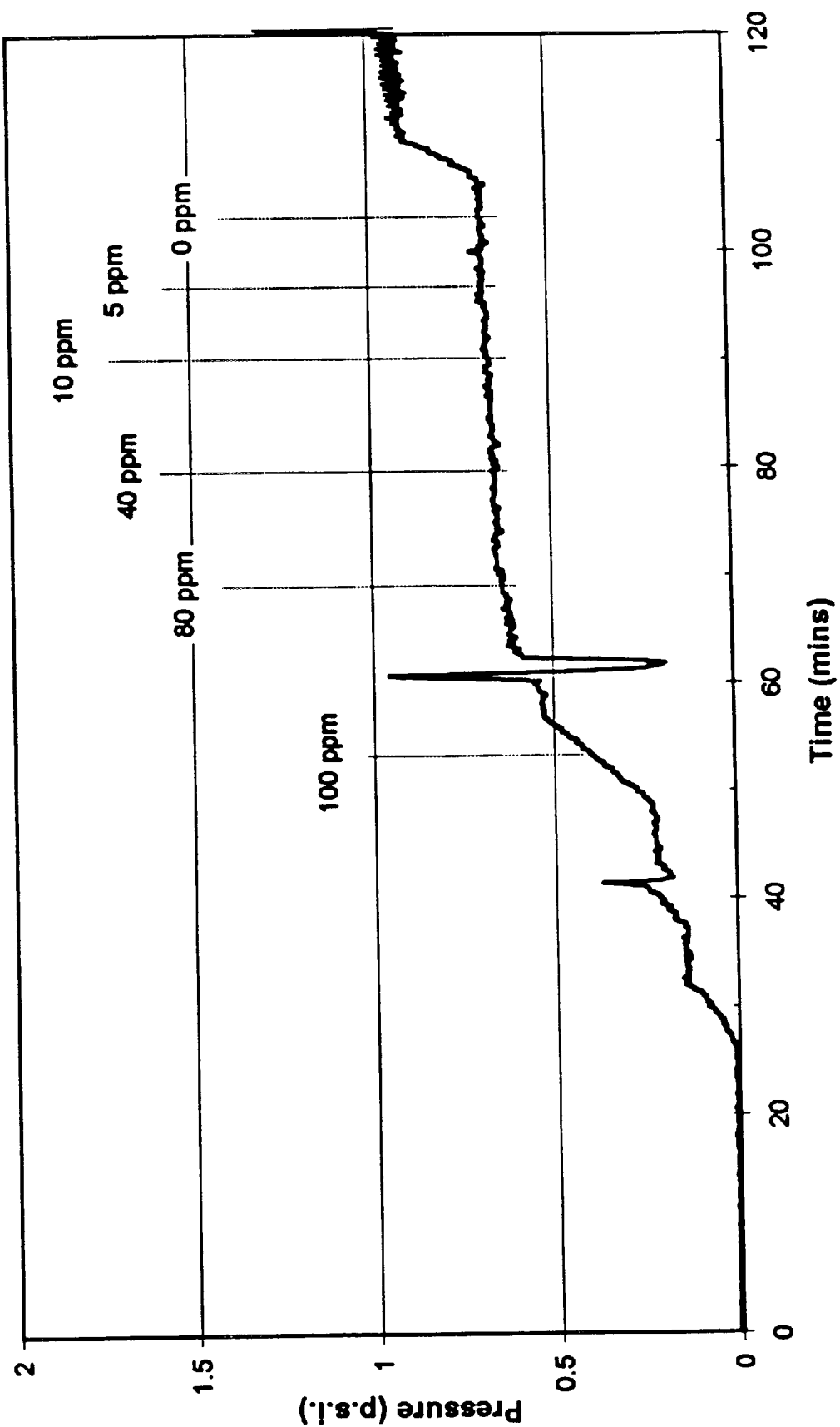
Figure 3 : MIC of Chem I (water based) using Brine C @90°C

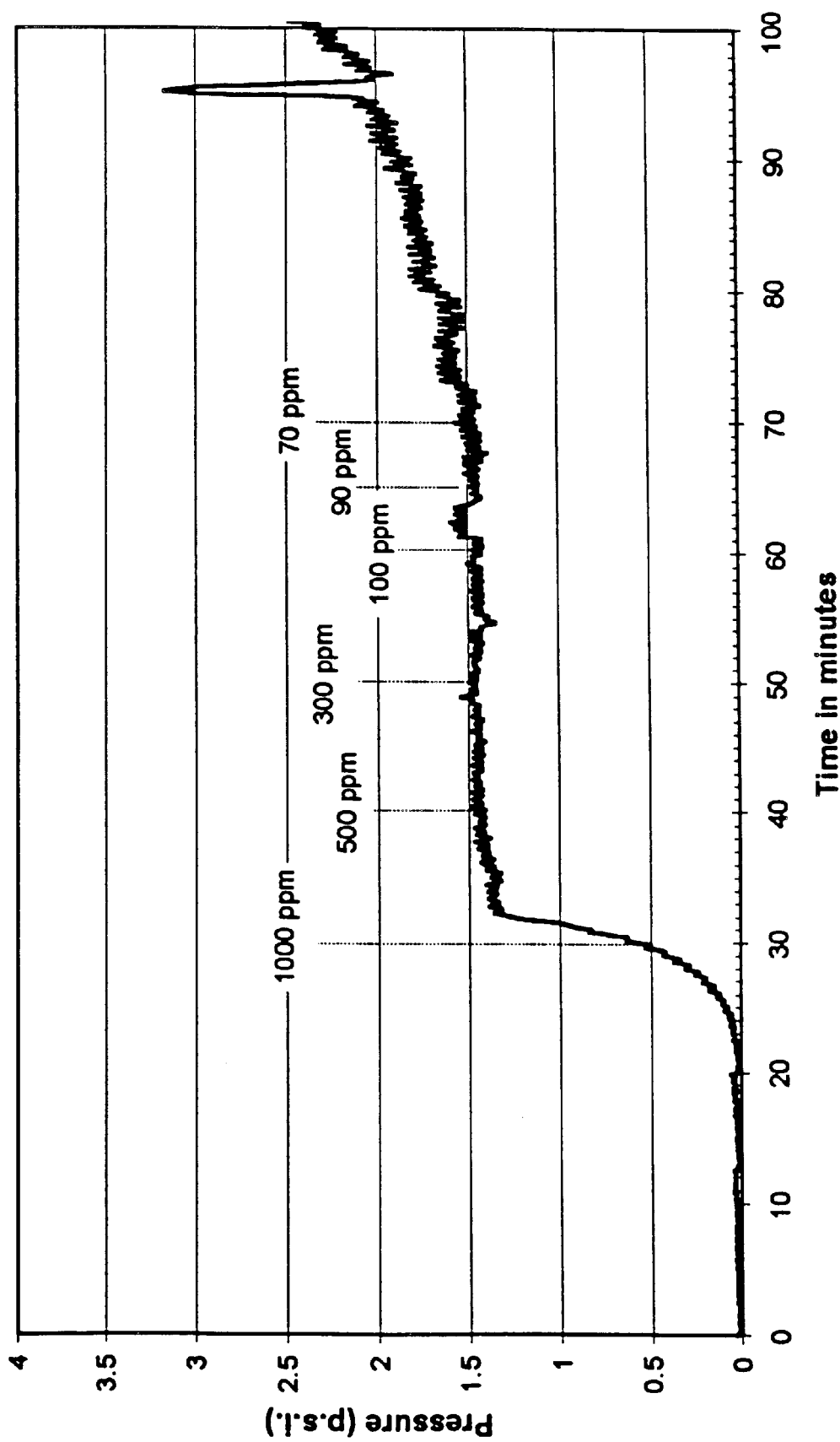

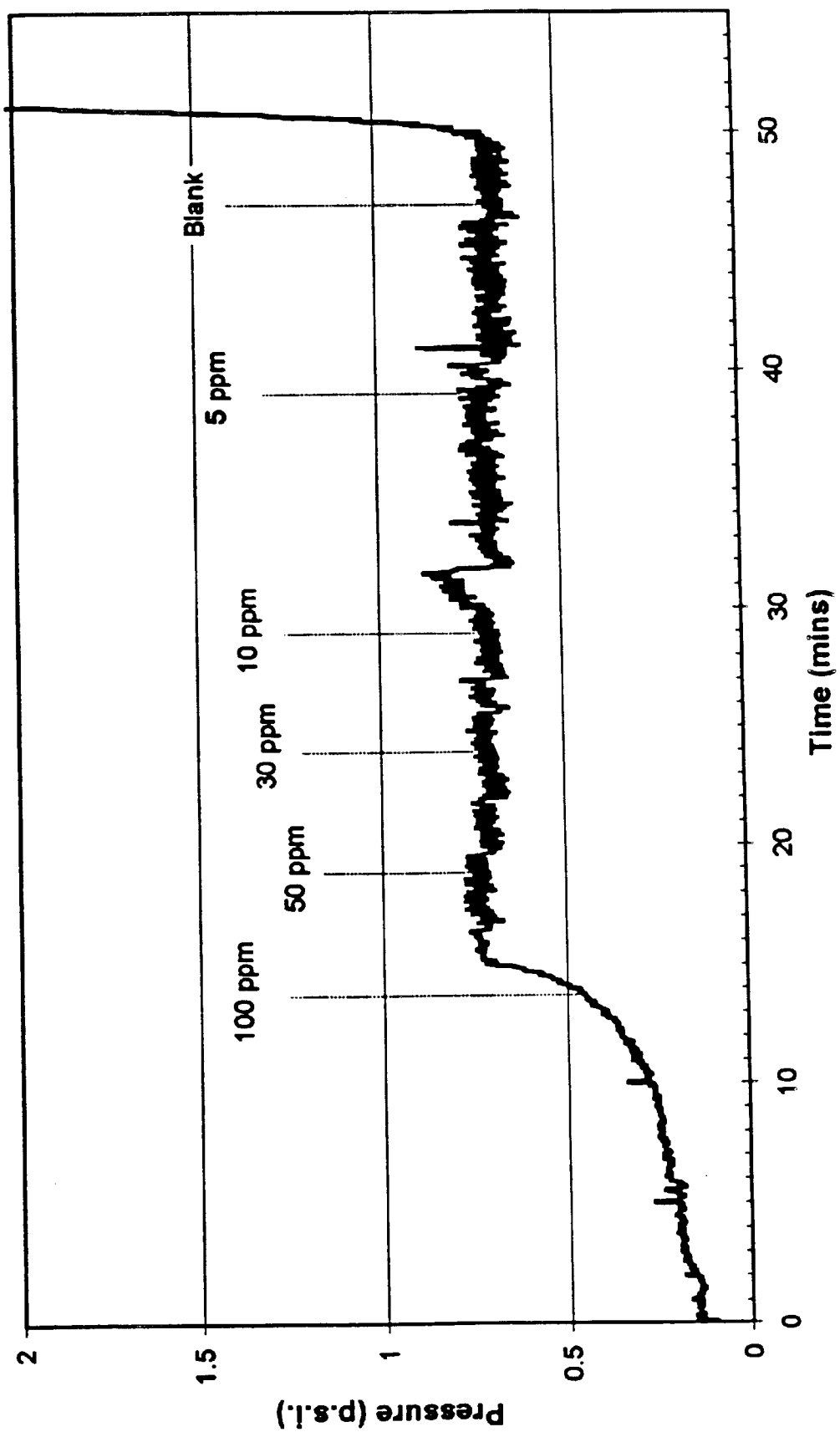

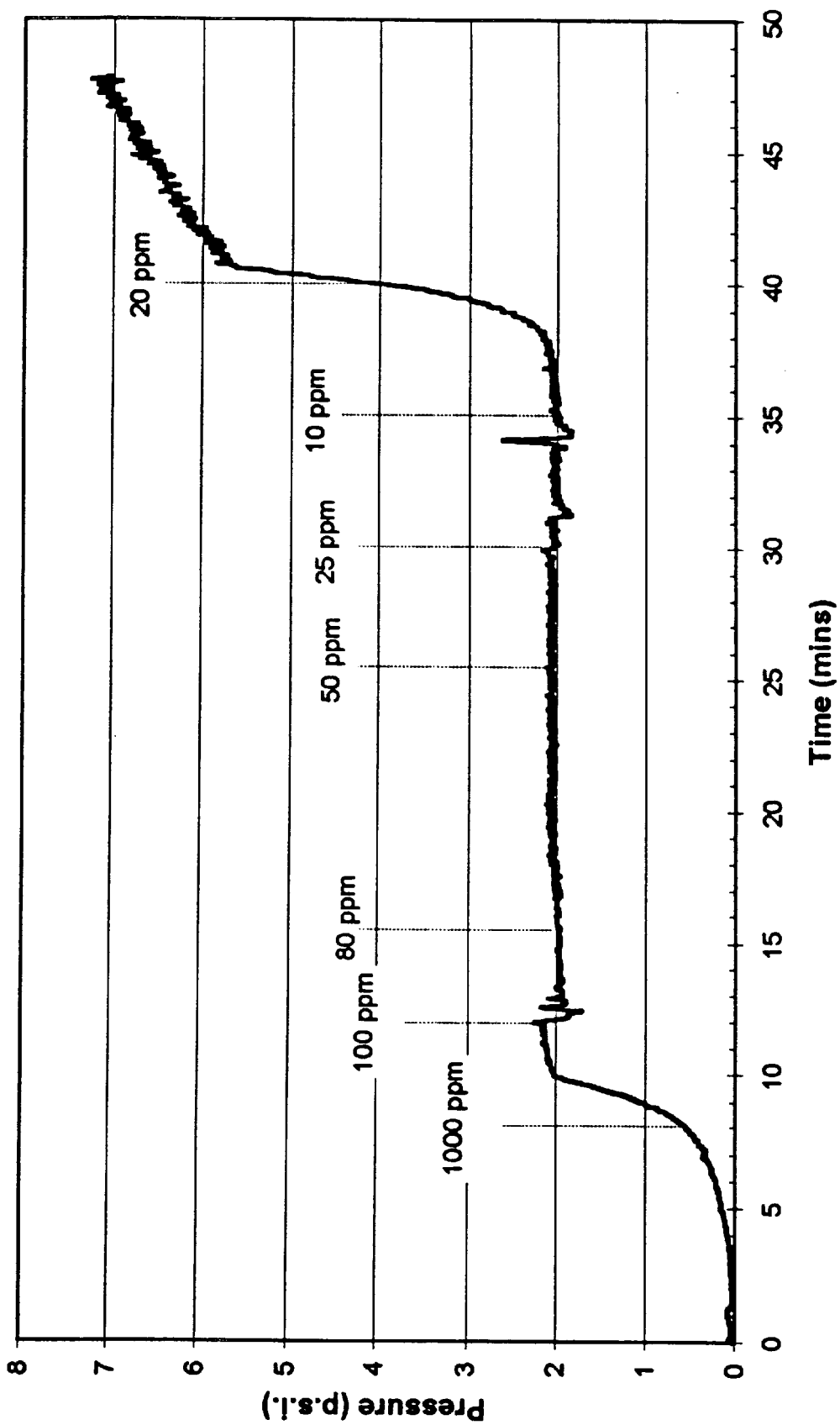

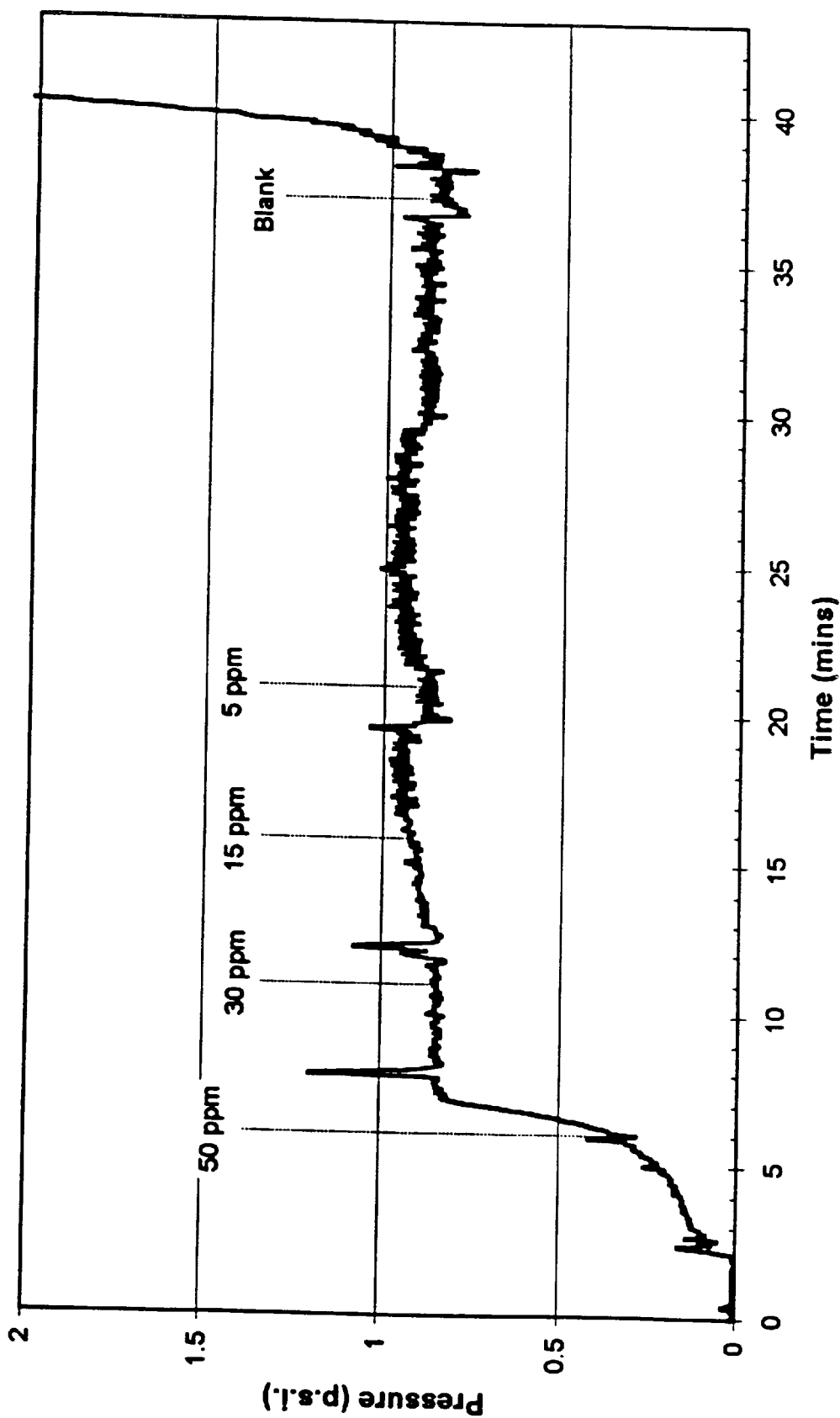

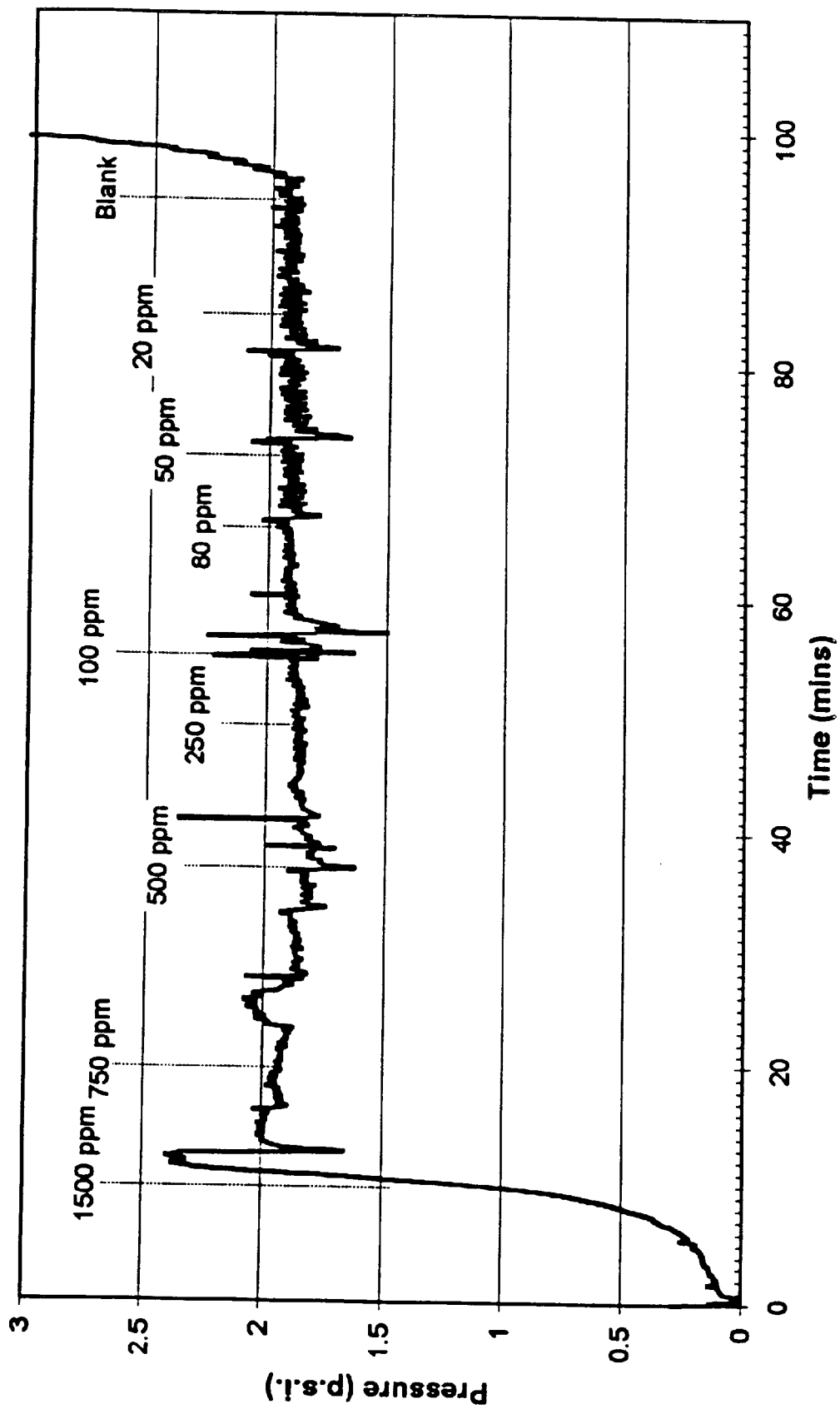
Figure 8: MIC of Chem III (Oil based) using Brine C @90°C

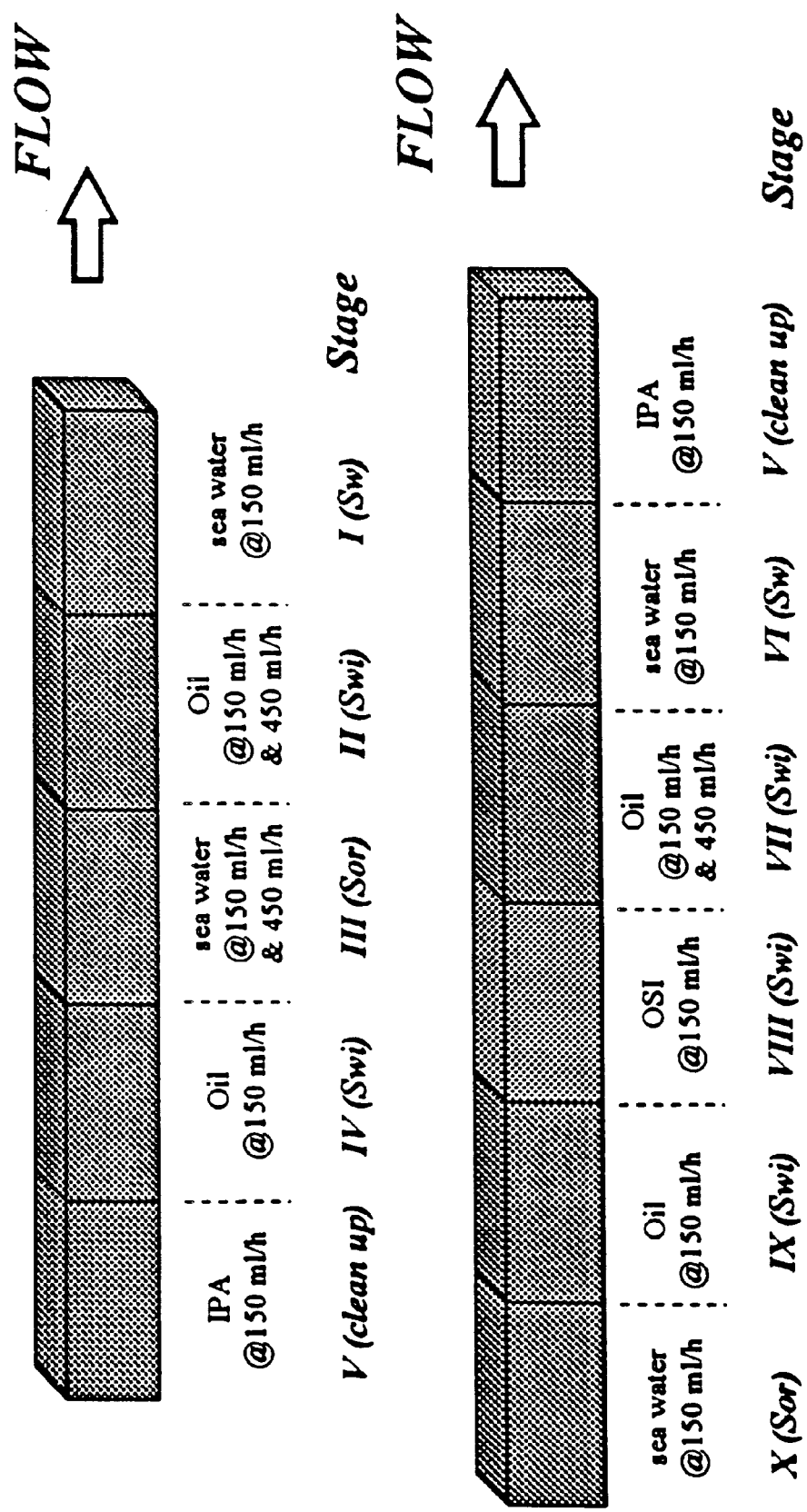
Figure 9: Injectivity Tests @90°C

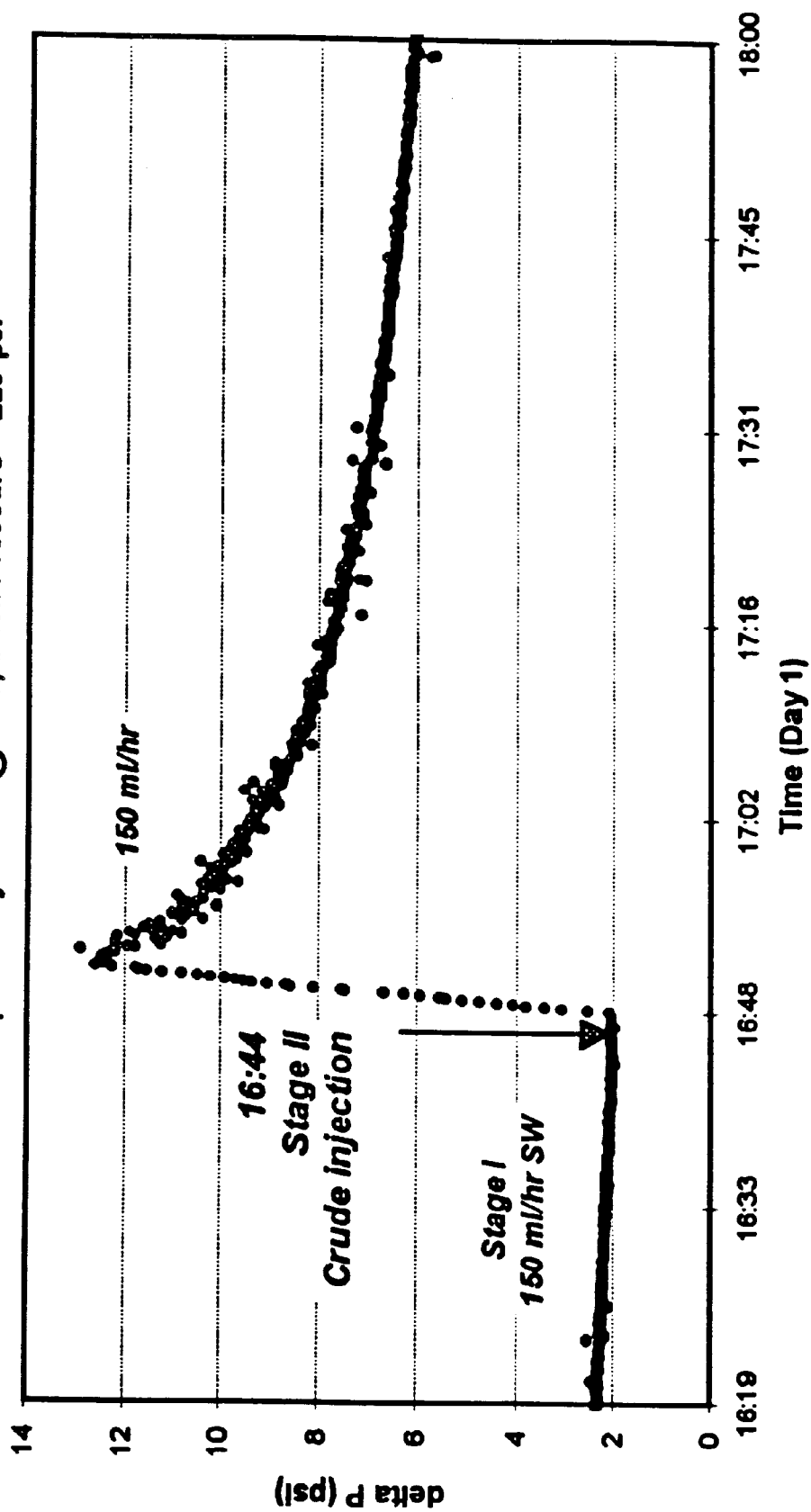

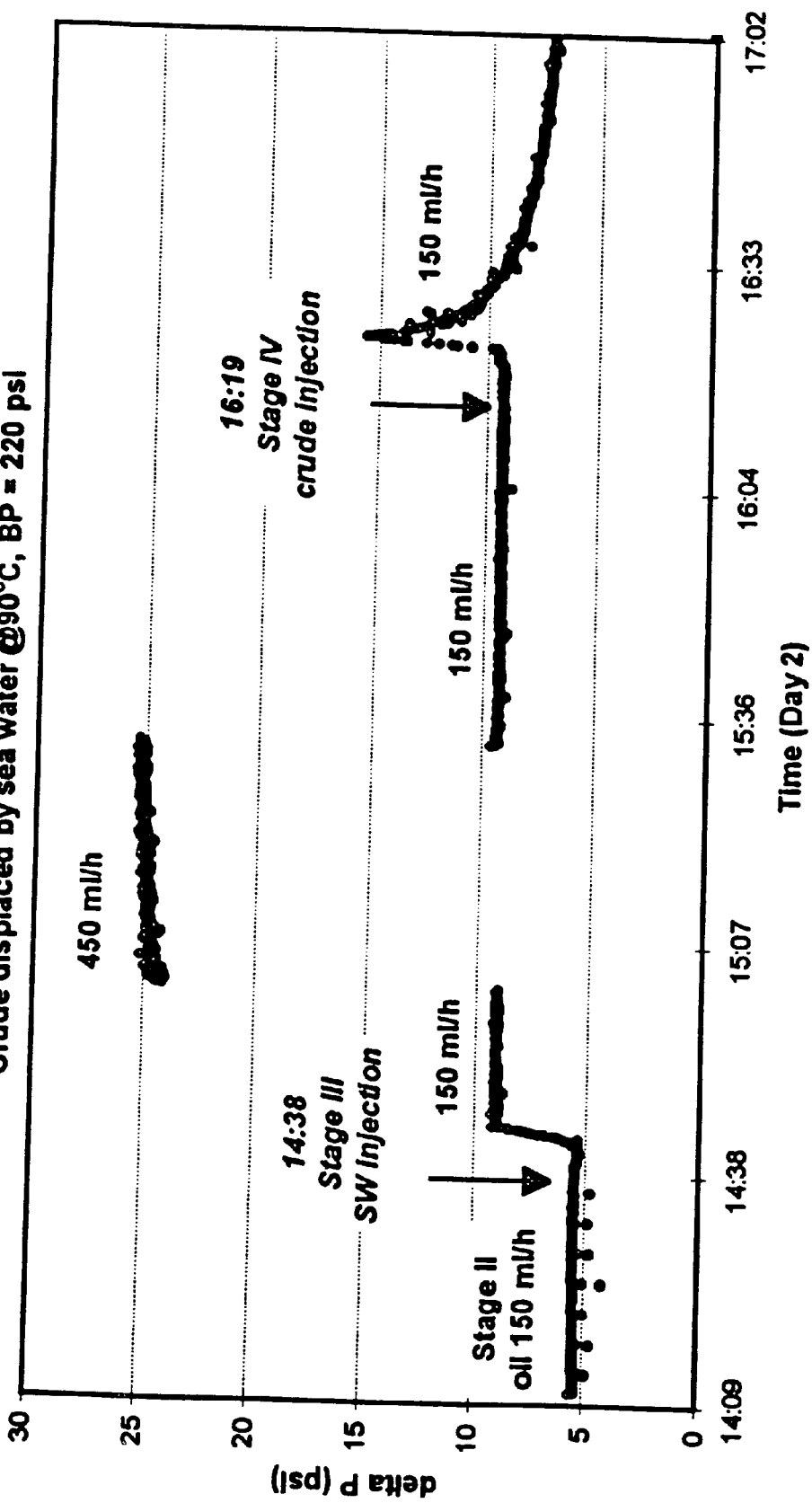
Figure f): Injectivity Test - From Swi to Sor

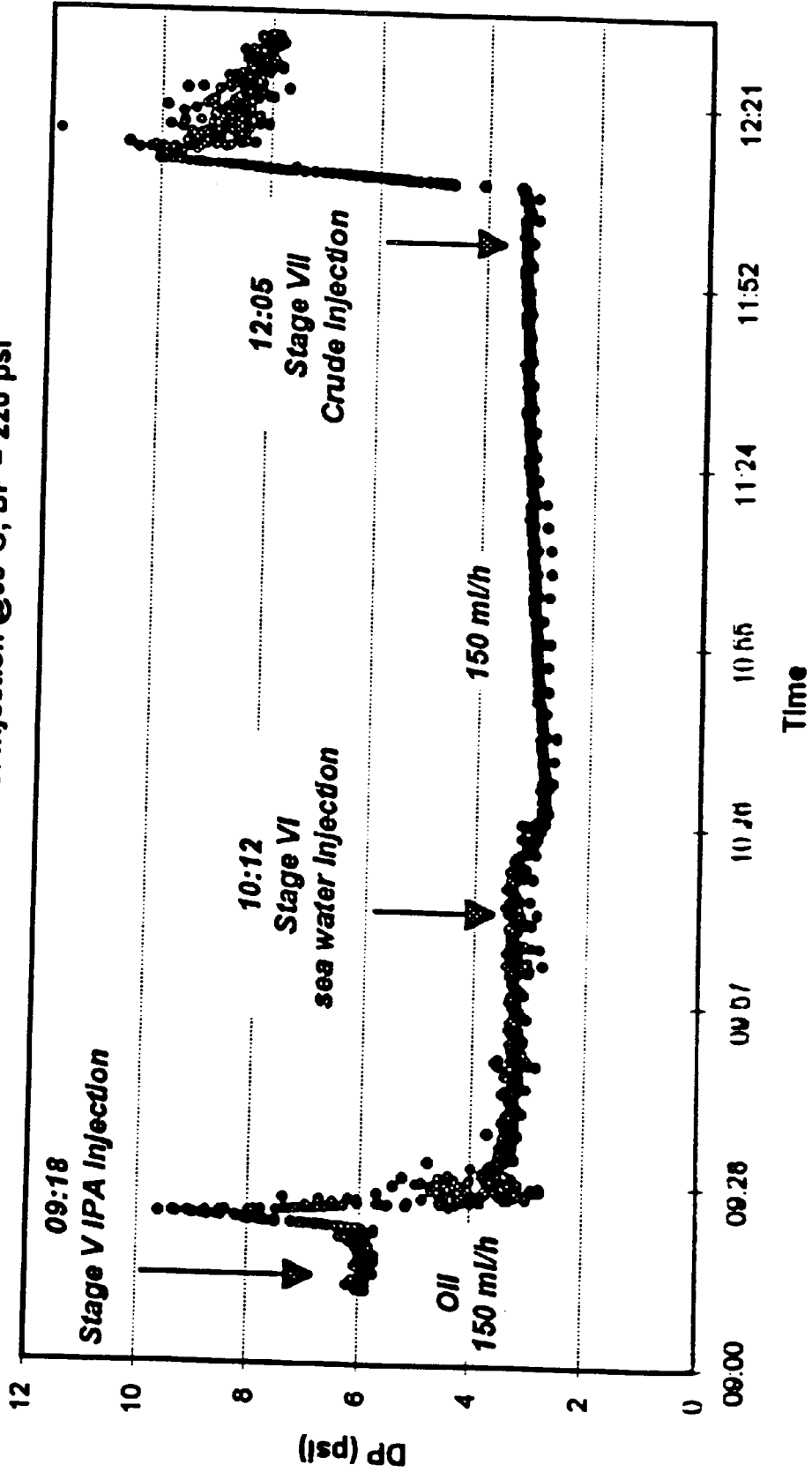

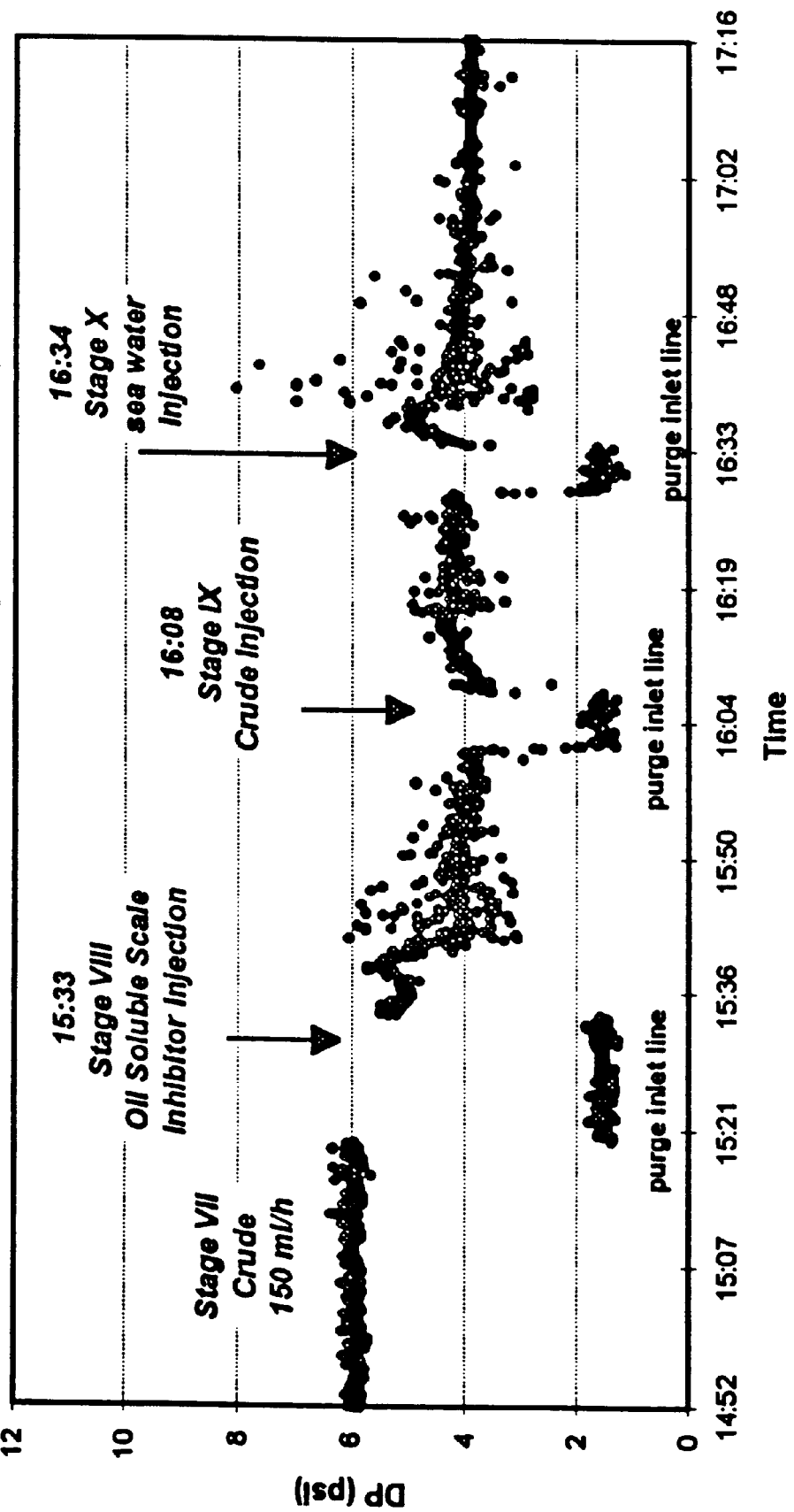
Figure 13: Oil Soluble Scale Inhibitor Injection

SCALE INHIBITORS

Applicant is claiming priority from a provisional application 60/094,219 filed on Jul. 27, 1998.

BACKGROUND OF THE DISCLOSURE

The present invention relates to compositions comprising oil-soluble scale inhibitors and their use in inhibiting oil field scale formation. More particularly, the present invention relates to compositions comprising an acid form of a known scale inhibitor and a tertiary alkyl primary amine. The compositions of the present invention may be used in inhibiting oil field scale formation. Such methods of use have many advantages over conventional techniques of inhibiting oil field scale, one benefit being a decrease in the period for which production of oil is suspended or reduced during treatment, and reducing the expense of the descaling operation. Furthermore, the compositions may be used in conjunction with other agents such as anti-corrosion agents, wax inhibitors and asphaltene inhibitors.

When a well bore is initially drilled in an oil field, the oil extracted is usually "dry", being substantially free of aqueous impurities. However, as the oil reserves dwindle, a progressively greater quantity of aqueous impurities becomes mixed with the oil. Changes in formation physical conditions during the production cycle as well as mixing of incompatible waters (i.e. sea water and barium or strontium containing formation waters) can cause scaling in any part of the production system. Scale that occurs in the production system can result in a significant loss in production and associated revenue.

One problem with scale formation in large industrial wells is the formation of scale on the equipment used to extract oil from the field, particularly on the interior surfaces of production tubing and at the perforations in the wall of the casing itself. At the well head, the sub-surface safety valve is also susceptible to damage caused by scale formation.

There are several conventional techniques to counter the problem of oil field scale formation, all of which bear significant disadvantages. The technique of "downhole squeezing" is commonly used, wherein inhibitor chemicals in aqueous solution are injected into the near-wellbore area. A typical squeeze in a vertical well will comprise a preflush, a squeeze pill and an overflush treatment, before the well is returned to normal function. The preflush, typically comprising a mixture of surfactant/demulsifier solution, stops the formation of emulsions that would block the perforation pores and may wet (with water) formation surfaces. The squeeze pill itself typically involves injection of inhibitor as a 1–20% solution in water, causing saturation of the matrix in a radial area around the well. The overflush comprises a displacement of the squeeze pill that propels the chemical front in a wider circumference around the well bore so that a significant surface of rock matrix is exposed to the inhibitor compound.

When the pressure applied down the well is reversed, about 30% of inhibitor chemical is often immediately flushed from the rock. The remaining solution adsorbs to the rock surface and acts to inhibit scale formation by constant treatment as fluid passes through the rock formation into the well conduit. However, over time the inhibitor is gradually washed from the rock surface as oil production continues until a further descaling treatment is required.

Various techniques have been used to try to increase the proportion of chemical that adsorbs to the rock. For example, the chemical can be "shut in" for a period of time with the expectation that the greater period of exposure to the rock surface might increase the degree of absorbency of inhibitor. However, this leads to an increase in the time for which a well is not in production and additionally is not considered to be particularly effective.

A further problem with downhole squeezing is that the aqueous solutions of scale inhibitor tend to change the wettability of the rock; due to its immiscibility with water, oil will not flow through "water-wet" rock. Once wet, the water permeability of the rock has been changed, sometimes permanently, so that a water channel may eventually open up into a water pocket, leading to the so-called "water coning" effect wherein a well is irreversibly damaged. Such a well will never again return to full productivity and new perforations need therefore be sunk in order to economically extract oil from the field.

Another problem with conventional techniques of treatment derives from the fact that aqueous solutions are usually more dense than the crude oil in the field. Consequently, once an aqueous solution of oil scale inhibitor has been used to treat a well, there is insufficient pressure support in the field for the well to flow naturally after treatment has finished. Consequently, the well must often be "gas-lifted" back into production using coil tubing until the natural oil pressure is sufficient to drive the flow once again. However, the gas lift facilities may not always be available and it is expensive and time-consuming to rig up temporary facilities.

If continuous injection facilities are available, the inhibitor compound may be applied continuously to the production stream. However, such facilities are not always feasible and are only available in relatively modern wells.

It is only now, with the advent of more advanced techniques for analyzing the process of oil extraction that the problems set out above have been appreciated. There thus exists a great need for a method of inhibiting oil scale formation that does not suffer from the disadvantages that beset conventional techniques.

Furthermore, in offshore natural gas production systems, alcohols such as methanol or ethylene glycol are often introduced into the well, well head or flow line to prevent formation of hydrates which can cause plugging problems in the same manner as scale deposition. When gas/condensate production occurs remotely from a platform via a sub-sea flow line, conventionally, chemical injection at the wellhead or downhole is supplied by an umbilical connector in which are contained a bundle of lines. It is necessary to supply scale inhibitor in a separate line because traditional scale inhibitors are generally intolerant of alcohols, to the extent that mixing of the two types of chemical causes severe precipitation problems with the scale inhibitor. However, each line is extremely costly. Accordingly, a scale inhibitor composition that is compatible with both traditional oilfield treatment chemicals and other organic solvent packages is particularly useful, since it avoids the necessity to supply the scale inhibitor separately.

SUMMARY OF THE INVENTION

According to a first aspect of the present invention there is provided a composition containing an oil-soluble scale inhibitor, said oil-soluble inhibitor comprising a scale inhibitor and a tertiary alkyl primary amine. Preferably, the composition is dissolved in a hydrocarbon or other fluid.

By oil-soluble is meant that the composition is infinitely soluble in usual hydrocarbon carriers such as diesel and kerosene. However, since scale formation in oil wells is only associated with the production of water in the well, it is essential that the scale inhibitor must be able to partition between phases so that it is water soluble in the process system or downhole and therein able to act as an inhibitor of scale formation.

Any inhibitor for which an acid form may be easily produced is suitable for use according to the present invention. Preferably, the acid form of scale inhibitor has a pH of typically less than 2.5. Scale inhibitors suitable for use in accordance with the present invention include phosphonates, acrylic co/ter-polymers, polyacrylic acid (PAA), phosphino carboxylic acid (PPCA) or phosphate esters or other traditional water based scale inhibitor chemistries. Suitable scale inhibitors are known to those of skill in the art.

In order to form a composition according to the present invention, the scale inhibitor in acid form is blended with an amine to form an oil-soluble mix. The scale inhibitor should be mixed with a tertiary alkyl primary amine, such as, for example, the tertiary alkyl primary amines marketed in the Primene® range of compounds (Rohm and Haas).

Tertiary alkyl primary amines possess several advantageous properties over other types of amines for blending with typical scale inhibitors. These advantages include the manageable reactivity of the nitrogen group that gives the chemist great control over the products generated in any reaction process. Additionally, the amines and derivatives thereof remain fluid over a wide range of temperatures and are soluble in hydrocarbon fluids such as kerosenes, diesel and HAN (Heavy Aromatic Naphthas).

The tertiary alkyl primary amine may possess one amine group or may possess multiple amino groups. Preferably, the tertiary alkyl primary amine comprises tertiary alkyl primary amines marketed in the Primene® range of compounds (Rohm and Haas), most preferably the Primene® 81-R range. The latter product comprises a mixture of amines in the $C_{12}$ to $C_{14}$ range.

It is envisaged that as and when new "green" amine compounds are developed that exhibit low toxicity, are biodegradable or do not accumulate in the environment, these amine compounds will be suitable for use in the present invention.

Examples of suitable scale inhibitors that are suitable for use in the compositions of the present invention include, hexamethylene diamine tetrakis (methylene phosphonic acid), diethylene triamine tetra (methylene phosphonic acid), diethylene triamine penta (methylene phosphonic acid), bis-hexamethylene triamine pentakis (methylene phosphonic acid), polyacrylic acid (PAA), phosphino carboxylic acid (PPCA) iglycol amine phosphonate (DGA phosphonate); 1-hydroxyethylidene 1,1 -diphosphonate (HEDP phosphonate); bisaminoethylether phosphonate (BAEE phosphonate) and polymers of sulphonic acid on a polycarboxylic acid backbone.

Suitable proportions of amine:scale inhibitor are those required to produce a reaction product that is infinitely soluble in nontraditional organic solvents such as those mentioned above. The precise proportions of amine to scale inhibitor used to make the composition will depend on the particular scale inhibitor, but generally will range between the ratios 100:1 to 1:3, more usually 8:1 to 1:13:2 for amine to scale inhibitor. The concentration of inhibitor in the reaction product may thus range between 10% and 50% by volume. Particularly suitable ratios are 3:2 Primene® to phosphonate, 4:1 Primene® to acrylic polymer. The below listed compositions are also effective as inhibitors of scale in oil well systems. The below listed compositions are also effective as inhibitors of scale in oil well systems. The proportions are only meant as an approximate estimate and variations around these values will be necessary depending upon the environment of the area for treatment. The proportions of scale inhibitor material for blending with the amine refers to proportions of commercially-sold inhibitor products, not proportions of the active ingredient. Most concentrated scale inhibitor commercial bases typically comprises 35–50% active solutions of scale inhibitor molecules.

| Scale Inhibitor generic | SI% | Amine |
| --- | --- | --- |
| ATMP Phosphonate | 40 | 60 |
| DETA Phosphonate | 40 | 60 |
| BHMT Phosphonate | 50 | 50 |
| MEA Phosphonate | 40 | 60 |
| Phosphino Carboxylic Acid | 20 | 80 |
| Acrylic co-ter-polymer | 20 | 80 |

To facilitate their application into a hydrocarbon production system, the scale inhibitor compositions of the invention may be supplied as a concentrate that can be diluted appropriately on site. This reduces the amount of the composition that needs to be conveyed to the site, thus making the transportation process more convenient.

The compositions may also be supplied as a specific dilution with hydrocarbon solvents such as HAN, diesel, base oil, kerosene, or condensate containing a specific concentration of oil soluble inhibitor that has been designed for a specific application. These compositions can be further blended into diesel or crude oil for use in the field.

Alternatively, the compositions may be supplied in other organic solvents not traditionally used with scale inhibitors as the primary solvent, such as methanol or isopropyl alcohol. Traditional scale inhibitors are generally intolerant of such alcohols, to the extent that they cause severe precipitation problems with the scale inhibitor.

Compositions can also be supplied as ready-made dilutions in solvent for direct use in the field, so that no additional mixing is required on site.

A composition according to the present invention may be dissolved in any hydrocarbon fluid. Preferably, the fluid is an aromatic hydrocarbon solvent such as, for example hydrocarbon fluids such as kerosenes, diesel, base-oil, HAN (Heavy Aromatic Naphtha) xylene, toluene, condensate, and crude oils. Additionally, the composition may be dissolved in other organic solvents not conventionally used as the primary solvent for scale inhibitor application, such as methanol or isopropyl alcohol.

The scale inhibitor will, of course, need to be present in the composition in a concentration effective for the inhibition of scale formation. The lowest concentration at which the scale inhibitor will be effective is termed its minimum inhibition concentration (MIC), which varies for different mineral contents of the brine water.

Another advantage provided by the compositions of the present invention is that they may be used in conjunction with hydrocarbon production treatment chemicals not conventionally combined with scale inhibitors due to their incompatibility with said scale inhibitors or with other oil-based production chemicals such as wax inhibitors, asphaltene inhibitors, corrosion inhibitors or hydraulic fluids. These chemicals include organic solvent-based production chemicals such as wax inhibitors, asphaltene dispersants and inhibitors, corrosion inhibitors, hydraulic fluids, scale dissolvers, paraffin solvents and dispersants, pour point depressants and wax fluids.crystal modifiers, demulsifiers, foamers and defoamers, gas hydrate inhibitors, biocides and hydrogen sulphide scavengers. This enables an engineer to administer a number of separate treatments in one batch, so decreasing the disruption to the working of the well and correspondingly making periodic overhaul of the well a more cost-effective process.

A particularly suitable wax inhibitor is Champion WM 1230 inhibitor and a particularly suitable asphaltene inhibitor is Champion WM1130 inhibitor. For wax inhibitor, suitable ratios include between 4:6 to 2:8 oil soluble inhibitor to wax inhibitor. Asphaltene inhibitor might be included in the following ratio; 2:1:7 of oil soluble inhibitor to wax inhibitor to asphaltene inhibitor. However, since the oil soluble inhibitor compositions of the invention are completely oil soluble, wax and/or asphaltene inhibitor can be included at any concentration above its MIC.

It has been found that the oil-soluble inhibitors of the present invention demonstrate a high affinity for heterogeneous rock and are adsorbed effectively. Dependent on the volume of oil that flows from the well during the time of operation, the effective period of action may be up to eighteen months.

According to a second aspect of the present invention there is provided the use of a composition according to the first aspect of the invention in a hydrocarbon production system. By hydrocarbon system is meant any part of the hydrocarbon production process from the wellbore area (including the rock matrix) to any facility or apparatus that makes delivery to a refinery or refinery process. Included as part of a hydrocarbon production system are surface equipment such as heater treaters, crude oil heaters, separators, manifolds, and flow control valves. Flow systems such as pipelines, whether for bulk transport or as field gathering systems, are also included as suitable targets for treatment. Other equipment suitable for treatment will be clear to the skilled worker.

Oil well systems and natural gas production systems are both included as suitable hydrocarbon production systems in which the compositions of the invention may be applied. Preferably, the composition is used in an oil well system. By oil well system is meant any part of the wellbore area (including the rock matrix) or the drill equipment.

According to a still further aspect of the invention there is provided a method of inhibiting oil scale formation in an oil well comprising introducing a composition containing oil-soluble scale inhibitor according to the first aspect of the invention in an effective amount into the environment of the well system.

It is envisaged that conventional downhole squeeze techniques will be most effective in the method of this aspect of the invention to introduce the compositions into the well bore environment as a batch treatment, although it is not intended that the method be limited to this technique. For instance, in wells where injection facilities are available, compositions according to the invention may be applied continuously to the production stream along with any other desired oil-soluble compounds such as wax inhibitors, asphaltene inhibitors and/or corrosion inhibitors.

Squeezing will typically involve the application of downward pressure on the well so that for a period of time the flow of oil effectively runs in reverse. A typical squeeze in a vertical well will comprise a preflush of around 50–150 barrels of inhibitor followed by injection into the rock matrix around the well bore in a radial area of between 200 and 1500 barrels of inhibitor. The overflush typically comprises an 8–20 foot squeeze using sea water, diesel or any other suitable fluid.

Alternative methods of introduction of the oil-soluble scale inhibitors of the present invention into the near system include the use of downhole and topside continuous injection, and gas lift treatments.

Various aspects and embodiments of the present invention will now be described in more detail by way of example. It will be appreciated that modification of detail may be made without departing from the scope of the invention.

BRIEF DESCRIPTION OF THE FIGURES

So that the manner in which the above recited features, advantages and objects of the present invention are attained can be understood in detail, more particular description of the invention, briefly summarized above, may be had by reference to the embodiments thereof which are illustrated in the appended drawings.

It is to be noted, however, that the appended drawings illustrate only typical embodiments of the invention and are therefore not to be considered limiting of its scope, for the invention may admit to other equally effective embodiments.

FIG. 1 is a graph showing the partition of oil soluble scale inhibitor (Chem II) at different temperatures;

FIG. 2 is a graph showing the partition of oil soluble inhibitor (OSI) with different initial concentrations;

FIG. 3 is a graph showing the MIC of Chem I (water-based) using Brine C at 90° C.;

FIG. 4 is a graph showing the MIC of Chem I (oil-based) using Brine C at 90° C.;

FIG. 5 is a graph showing the MIC of Chem II (water-based) using Brine C at 90° C.;

FIG. 6 is a graph showing the MIC of Chem II (oil-based) using Brine C at 90° C.;

FIG. 7 is a graph showing the MIC of Chem III (water-based) using Brine C at 90° C.;

FIG. 8 is a graph showing the MIC of Chem III (oil-based) using Brine C at 90° C.;

FIG. 9 is a diagrammatic illustration of injectivity tests performed at 90° C.;

FIG. 10 is a graph showing the increase in pressure as oil is introduced at the inlet face in an injectivity test;

FIG. 11 is a graph showing the rate and extent of pressure changes as oil is introduced into the matrix;

FIG. 12 is a graph showing the pressure change as the core is cleaned with IPA; and FIG. 13 is a graph showing the pressure response during the final cycle of injection involving the oil-soluble inhibitor.

DEFINITIONS

In the below examples, all references to "amine" refer to the Primene® 81R product sold by Rohm & Haas. OSI means oil soluble inhibitor.

All references to Chem I, Chem II and Chem III relate to compositions containing defined components in specific ratios as described in the below Table I. The percentage of scale inhibitor is also given for clarity.

Scale inhibitor SA990 is sold by Champion Technologies. DETA phosphonate is diethylene triamine tetra (methylene phosphonic acid); BHMT phosphonate is bis-hexamethylene triamine pentakis (methylene phosphonic acid).

TABLE 1

| Chem | Amine (Primene ®) | Phosphonate | HAN | Scale inhibitor % |
|---|---|---|---|---|
| I | 3 | 2 (product SA990) | 15 | 10 |
| II | 3 | 2 (DETA phosphonate) | 5 | 20 |
| III | 3 | 3 (BHMT phosphonate) | 6 | 25 |

Experiments are shown below that demonstrate that compositions according to the present invention behave like a "normal" scale inhibitor in preventing scale formation when partitioned into the aqueous phase.

EXAMPLES

Example 1
Partitioning Mechanisms

Like the other mass transfer processes, the partition kinetics of the oil soluble scale inhibitor among the different phases will depend on a number of factors, such as the scale inhibitor type, the mixing regime, temperature, concentration gradient, contact time, brine composition and the type of hydrocarbon fluid.

The effect of temperature on the partition process is illustrated in FIG. 1. In this test a duplicate set of 8 oil soluble scale inhibitor samples, of various concentrations (1,400 ppm to 70,000 ppm), were mixed with Brine D (Table 2). The oil to brine ratio was kept at 1:3.4. One set of samples was heated to 60° C. whilst a duplicated set was heated to 85° C. The samples were shaken regularly and after overnight lock-in at temperature. The aqueous portions were drained off and analyzed for scale inhibitor concentration. It is clear from FIG. 1 that the amount of scale inhibitor partitioned in the water increased with temperature.

TABLE 2

Brine Compositions used for OSI Tests

| | Brine A | Brine B | Brine C | Brine D |
|---|---|---|---|---|
| pH | 5 | 6 | 5.5 | 8 |
| Ca++ | 1,400 ppm | 650 ppm | 12,000 ppm | 260 ppm |
| HCO3- | N/A | N/A | 500 ppm | 650 ppm |
| TDS | 40,000 ppm | 35,000 ppm | 135,000 ppm | 4,000 ppm |

[TDS: Total dissolved solids]

The effect of concentration gradient on the partition process can be illustrated by FIG. 2. In this test a 10% and a 3.3% oil soluble scale inhibitor solutions were prepared. These were mixed with Brine A (Table 2) at three different oil : brine ratios, i.e., 1:4, 1:1 and 4:1. The six samples were shaken vigorously before placed in an oven overnight at 120° C. The brine portions were withdrawn and analyzed for the scale inhibitor concentration in the following day. The results in FIG. 2 confirm that the partitioning of scale inhibitor in the water phase increases with the initial oil-soluble inhibitor concentration.

Indeed, for the sample with an oil to brine ratio of 4:1, the equilibrium concentration in the brine was found to be significantly higher than that in the original OSI sample, i.e., 24,560 ppm vs. 17,000 ppm for the 10% solution and 14,280 ppm vs. 5,610 ppm for the 3.3% solution. This enhanced mass transfer process, with a partition coefficient (defined as $Mass_{oil\ phase}/Mass_{water\ phase}$) greater than one, indicates that a better chemical utilization can be achieved in the field. For squeeze treatment, this means that an OSI pill with a lower concentration than that in a normal water based pill can achieve a similar adsorption efficiency.

The results in FIGS. 1 & 2 confirm that the oil soluble scale inhibitor will partition into the water phase. The rate and the amount of mass transfer can be increased with temperature and concentration gradient.

Example 2
Scale inhibitor function

The next crucial question was whether the partitioned molecules behave like a "normal" scale inhibitor in preventing scale formation. FIGS. 3 to 8 show the results of dynamic tube blocking tests using Chem II diluted 50:50 with either HAN or base oil.

The dynamic tube blocking test is one of the standard procedures in checking scale inhibitor performance. If the inhibitor product is working and the dose rate is adequate it will stop scale deposit in the coil (tubing of 1/16" to 1/8" OD) which in turn will not cause pressure build-up. After first allowing the coil to prescale, causing an initial rise in pressure, the system is dosed with a known scale inhibitor concentration (normally in excess). The pressure will level off as deposition is stopped. The dose rate is then stepped back until the pressure shows sign of rising again. The minimum inhibition concentration (MIC) of the product is thus defined. Obviously the MIC value will vary with the type of brine (severity of scale) and the test temperature.

The tests were carried out at 90° C. using Brine C (Table 2). The activity of the scale inhibitor used, both in the oil and water form, is shown in Table 3. It is clear from the pressure profiles and from Table 3 that the oil soluble scale inhibitor, once partitioned in the water, will inhibit scaling. More importantly, the partitioned molecules offer the same level of MIC as with the water-based product. The short residence time of the tube blocking test indicates that the partitioning process must be fast enough to enable the water bound scale inhibitor to function.

TABLE 3

MIC of scale inhibitors from Dynamic Tests

| | MIC | Ref. |
|---|---|---|
| Chem I (100% in water) | <5 ppm | FIG. 3 |
| Chem I (10% in oil) | 70–90 ppm | FIG. 4 |
| Chem II (100% in water) | <5 ppm | FIG. 5 |
| Chem II (20% in oil) | 10–25 ppm | FIG. 6 |
| Chem III (100% in water) | <5 ppm | FIG. 7 |
| Chem III (25% in oil) | <20 ppm | FIG. 8 |

Example 3
Multi-stage contact

Apart from inhibition performance, an oil soluble scale inhibitor must exhibit desorption characteristics similar to a water-based product in order to be considered for squeeze treatment.

It could be stated that the tests described above resemble only a single stage contact in the partition process and therefore that these results do not fully reflect the full mechanisms which will take place in real life. For example, in field applications, the oil soluble scale inhibitor is likely to be in continuous contact with fresh brine, e.g., the chemical front during a squeeze treatment. Whilst most of the inhibitor molecules will partition into the water phase on their first contact, some of them will remain in the oil phase.

In order to assess what would happen to inhibitor molecules remaining in the oil phase after the initial contact with aqueous phase and a multi-stage contact, a test was performed in which the oil soluble scale inhibitor was repeatedly mixed with fresh brine. The results are present in FIG. 10.

In this test we used an Oil: Brine (Brine B) ratio of 9:1. The initial oil soluble scale inhibitor concentration was 10% (17,000 ppm of P4+). The test was carried out at 80° C. The sample was shaken regularly and a known fraction of the brine was withdrawn at an hourly interval. After each withdrawal fresh brine was added to the mix so as to maintain the oil: brine ratio at 9:1. The water samples collected were analyzed for the scale inhibitor concentration.

The results clearly illustrate the trend of recovering the oil soluble scale inhibitor through a multi-stage "washing" process. There was scale inhibitor partitioned in each stage with the highest return in the first contact. The cumulative amount of scale inhibitor recovered during the nine stages was estimated to be 30% of the original mass with the first stage recovering approximately 10% of the total. The partition rate was believed to be very fast in this test.

The partitioning efficiency of the OSI observed in the beaker tests, including the cumulative recovery from the multi-stage contact, is likely to be conservative for squeeze treatment consideration. This is because in the presence of a solid phase (e.g., a sand grain) there will be an additional mass transfer process adsorption onto the solid surface. The scale inhibitor molecules, once partitioned into the water phase, will be free to migrate towards the grain surface. If there are adsorption sites available the molecules will bind to the surface. This effectively maintains a concentration gradient between the oil and the water and is continuously driving the partitioning process until the available solid phase adsorption sites have been occupied.

It is therefore feasible that, for the same generic type of scale inhibitor, the utilization of the chemical can be more efficient if it is oil soluble. Through the partitioning mechanisms described earlier, the scale inhibitor concentration in the aqueous phase can be driven higher than that in the original oil phase. A lower concentration pill could be used for the oil soluble product and still achieve the same adsorption level as a water based product, which could also mean less wastage of chemical in the initial squeeze return.

Example 4

Injectivity Tests

One of the main benefits of squeezing an oil soluble scale inhibitor into a dry or low water cut well is to avoid the injection and back flow problems caused by water ingress. We provide herein a direct comparative study in quantifying the effect of relative permeability on the flow of different phases in a porous medium. In the course of developing the new OSI products, we have carried out a series of injectivity tests. The tests consist of 10 different stages and these can be grouped into two distinctive cycles as shown in FIG. 9.

The first cycle of injections (stage I to V) was designed to establish the base line pressure profile when either oil or brine was used as the displacing fluid. In these tests the differential pressure ($\Delta P$) profiles represented the transient and the end points of an immiscible displacement process. They indicated the necessary increase in placing and the subsequent back flowing of an immiscile fluid. Using the same core sample the second cycle of injection was intended to highlight the differences in the pressure response of a miscible displacement process.

In the second cycle we used the isopropyl alcohol (IPA) as the solvent since it was miscible with both the oil and the brine. The main step was stage VIII when we used an oil soluble scale inhibitor to displace the crude. This provided a comparison with stage III in which the oil was displaced by the brine.

The conditions of the injectivity tests are summarized below.

| Test Conditions | |
|---|---|
| Temperature | 90° C. |
| Overburden Pressure | 2000 psi |
| Back Pressure | 220 psi |
| Nominal Flow Rate | 150 ml/hr |
| Core Properties | |
| Material | Clashach sandstone |
| Permeability | 533 mD |
| Porosity | ~18% |
| Dimensions | 2.5 cm dia × 15 cm L |
| $S_{or}$ | ~35% |
| $S_{wi}$ | not measured |
| Fluid System | |
| Brine | sea water (without $HCO_3^-$) |
| Oil | ~38° API crude (stabilized) |
| SI | Oil Soluble Scale Inhibitor |
| Solvent | IPA (core cleaning/conditioning) |

In stage I, the core was first saturated with sea water and the permeability was determined. This was followed by the injection of the crude oil (stage II). The sharp increase in the differential pressure ($\Delta P$) across the core, as shown in FIG. 10, represented the arrival of the oil at the inlet face. After peaking at −13 psi, the $\Delta P$ decreased gradually as most of the brine had been displaced by the crude. The nearly six times increase in the $\Delta P$, i.e., from 2 to ~13 psi, was significant. This was mainly due to the strongly water wet Clashach core material and the core was initially saturated with brine. For reservoir rock materials the increase in $\Delta P$ may be less noticeable due to their mixed wettability. In the field, the hydrostatic head exerted by the water column in the well also helps to mask such increased pressure. Indeed in some cases, it has been noticed that there is a negative injection pressure (i.e., suction mode) once a certain volume of sea water has been pumped into the well.

Stage III, brine injection, and stage IV, crude injection, were to condition the core to the residual oil saturation ($S_{or}$) and the irreducible water saturation ($S_{wi}$) respectively. The pressure profile recorded during this period, as shown in FIG. 11, resembles the pressure increase when a water based SI pill is being squeezed into a dry oil zone. In the field, whilst one can maintain the injection rate so long as it stays within the frac-gradient, the back flow is less controllable. How easy and how fast the well re-flows will depend on the available draw down. For a well with weak lifting energy, there can be a big reduction in the total production rate. This will continue until the near wellbore area is cleaned up from the extensive water ingress associated with the squeeze treatment. It is important to realize that the shape, the rate and the extent of the pressure rise, as observed in FIGS. 10 to 13, are strongly dependent on the matrix and fluid properties, i.e. wettability, pore connectivity, pore size and fluid viscosity, and so on.

At the end of stage IV, isopropyl alcohol (IPA) was injected into the core. The use of IPA had two objectives. Firstly, it was used to clean the core so that a 100% brine saturation could be re-established and the remaining flood cycle commenced. Secondly since the IPA was miscible with both the brine and crude it would provide a reference pressure profile when the OSI was used to displace the oil at a later stage.

The ΔP recorded during this period is presented in FIG. 12 which shows a surprise peak at the start. The initial spike was caused by the propagation of the oil and water "banks" since IPA was used as the displacing fluid. Although the IPA was miscible with both the crude and the brine, complete mixing was only achieved at the displacement front where there was contact. In a one dimensional flow as in the core test the displacement (miscible) front would push ahead both the oil and water and cause the "banking" of the different fluid. On the other hand, there was almost no change in the ΔP response when the sea water was displacing the IPA in stage VI since the core was 100% saturated with the IPA at this time.

After the core was cleaned and resaturated with brine, crude oil was once again injected to condition the core to $S_{wi}$ (stage VII).

The final cycle of injection including the OSI, the crude oil ($1^{st}$ post flush) and the brine ($2^{nd}$ post flush) then began. The ΔP response during this period was recorded and is presented in FIG. 13. As expected, there was no noticeable rise in the ΔP when the oil soluble scale inhibitor was displacing the crude. Indeed, there was a minor drop in the ΔP as the injection of the OSI continued. The drop in ΔP was likely due to a combination of different fluid viscosity and a further reduction in the water saturation. As the OSI started breaking through, a small amount of water (~1 ml) was observed in the effluent. Although the core had been driven to irreducible water saturation ($S_{wi}$) previously, the partitioning of the OSI into the connate water seemed to alter the brine properties. Indeed in the compatibility tests which were carried out separately, we had noticed the "poor" interface between the OSI and the brine at equilibrium, i.e. long settling time after samples had been shaken. This indicated that there was a reduction in the interfacial tension. The level of irreducible water saturation ($S_{wi}$) is strongly affected by the oil/water interfacial tension, fluid viscosity and displacement velocity.

The pressure responses in stage IX and X were as expected.

There was little change in the ΔP when the OSI was displaced by the crude oil and vice versa, indicating full miscibility. On the other hand there was a small rise in ΔP when the brine was finally injected to displace the crude.

Example 5

Preparation of compositions

An oil soluble scale inhibitor was prepared by mixing an acid DETA phosphonate solution (pH-1) with a tertiary alkyl primary amine (Primene® 81-R; Rohm & Haas) with a ratio of 3 part amine to 2 part of phosphonate. The mixture was shaken vigorously in order to obtain a homogenized solution. There was some air entrained and heat generated due to mixing but the solution cooled and became clear after left standing for a short time. No addition of mutual solvent of any kind was needed. The resulting mix was quite viscous and was diluted in a heavy aromatic naphtha (HAN) to reduce its viscosity. The composition of the mix was:

| Component | Wt % |
|---|---|
| DETA phosphonate | 20 |
| Tertiary alkyl primary amine | 30 |
| HAN | 50 |

The scale inhibitor was found to partition back into the water phase when the mixture was in contact with a brine A. In our tests a 50% and a 16.7% of the above mix were prepared using base oil. These were mixed with Brine A at three different oil brine ratios, i.e., 1:4, 1:1 and 4:1. The six samples were shaken vigorously before placed in an oven overnight at 1 20° C. The brine portions were withdrawn and analyzed for the scale inhibitor concentration in the following day. The results confirmed that the partitioning of scale inhibitor in the water phase increased with the initial OSI concentration. Indeed, for the sample with an oil to brine ration of 4:1, the equilibrium concentration in the brine was found to be significantly higher than that in the original OSI sample, i.e., 24,560 ppm vs. 17,000 ppm for the 10% solution and 14,280 ppm vs. 5,610 ppm for the 3.3% solution.

Once partitioned in the water the scale inhibitor performed well in inhibiting scale formation. This was confirmed by the dynamic tube blocking tests commonly used for product screening. The tests were carried out at 90° C. using a Brine C and for comparison a water based acid DETA phosphonate was included (Gyptron® KT-178; Champion Technologies).

The results confirmed that the partitioned molecules offer the same level of MIC as with the water based product. The short residence time of the tube blocking test indicated that the partitioning process must be fast enough to enable the water bound scale inhibitor to function properly.

Example 6

Preparation of compositions

An oil soluble scale inhibitor was prepared by mixing an acid BHMT phosphonate (pH-1) with a tertiary alkyl primary amine with a ratio of 3 part amine to 3 part of phosphonate. The mixture was shaken vigorously in order to obtain a homogenized solution. There was some air entrained and heat generated due to mixing but the solution cooled and became clear after left standing for a short time. No addition of mutual solvent of any kind was needed. The resulting mix was quite viscous and was diluted in a heavy aromatic naphtha (HAN) to reduce the viscosity. The composition of the mix was:

| Component | Wt % |
|---|---|
| DETA phosphonate solution | 25 |
| Tertiary alkyl primary amine | 25 |
| HAN | 50 |

The scale inhibitor was believed to partition back into the water phase later on when the mixture was in contact with a brine. Once partitioned in the water, the scale inhibitor also performed well in inhibiting scale information. This was confirmed by the dynamic tube blocking tests commonly used for product screening. The tests were carried out at 90° C. using a Brine C and for comparison a water based acid BHMT phosphonate was included (Gyptron® KT-252; Champion Technologies). The results confirmed that the partitioned molecules offer the same level of MIC as with the water based product. The short residence time of the tube blocking test indicated that the partitioning process must be fast enough to enable the water bound scale inhibitor to function properly.

What is claimed is:

1. A composition comprising an oil-soluble scale inhibitor in a solvent, said oil-soluble scale inhibitor comprising a scale inhibitor and a tertiary alkyl primary amine.

2. The composition of claim 1, wherein said solvent is a hydrocarbon fluid.

3. The composition of claim 2, wherein said solvent is selected from the group consisting of kerosenes, diesel and Heavy Aromatic Naphthas.

4. The composition of claims 1 wherein the scale inhibitor has a pH of less than about 2.5.

5. The composition of claim 4 wherein the scale inhibitor is selected from the group comprising phosphonates, polyacrylic acid, phosphino carboxylic acid and acrylic co/ter-polymers.

6. The composition of claim 5 wherein the ratio of tertiary alkyl primary amine to a phosphonate scale inhibitor is 3:2.

7. The composition of claim 5, wherein the ratio of tertiary alkyl primary amine to a polymer scale inhibitor is 4:1.

8. The composition of claim 1 wherein the tertiary alkyl primary amine possesses more than one amino group.

9. The composition of claim 1 wherein the scale inhibitor is selected from the group consisting of hexamethylene diamine tetrakis (methylene phosphonic acid), diethylene triamine tetra (methylene phosphonic acid), diethylene triamine penta (methylene phosphonic acid) and bis-hexamethylene triamine pentakis (methylene phosphonic acid).

10. The composition of claim 1, wherein said composition is in combination with wax inhibitors, asphaltene inhibitors, corrosion inhibitors or hydraulic fluid.

11. The composition of claim 1 wherein the proportions of tertiary alkyl primary amine to scale inhibitor are between the ratios 8:1 and 1:1.

12. A method of treating a producing oil well susceptible to scale formation comprising the steps of injecting into the well an oil soluble scale inhibitor where the inhibitor comprises a scale inhibitor and a tertiary alkyl primary amine.

13. The method of claim 12 wherein the scale inhibitor is introduced in a hydrocarbon solvent and the scale inhibitor has a pH of less than about 2.5.

14. The method of claim 13 wherein said scale inhibitor is selected from the group consisting of phosphonates, polyacrylic acid, phosphino carboxylic acid and acrylic co/ter-polymers.

15. The method of claim 13 wherein the hydrocarbon solvent is selected from the group consisting of kerosene, diesel and Heavy Aromatic Naphthas.

16. The method of claim 12 wherein the tertiary alkyl primary amine has one or more amino groups.

17. The method of claim 12 wherein the scale inhibitor is selected from the group consisting of hexamethylene diamine tetrakis (methylene phosphonic acid), diethylene triamine tetra (methylene phosphonic acid), diethylene triamine penta (methylene phosphonic acid) and bis-hexamethylene triamine pentakis (methylene phosphonic acid).

18. The method of claim 12 further comprising the step of injecting the oil soluble scale inhibitor in conjunction with other additives selected from the group consisting of wax inhibitors, asphaltene inhibitors, corrosion inhibitors, hydraulic fluid, or mixture thereof.

19. The method of claim 12 wherein the tertiary alkyl primary amine in proportion to the scale inhibitor is between a ratio of about 8:1 to about 1:1.

20. A method of treating a well comprising the step of injecting an oil soluble scale inhibitor into an oil system having a flow of oil or gas to deliver the inhibitor to water based scale.

* * * * *